United States Patent [19]
Kendall

[11] Patent Number: 6,073,953
[45] Date of Patent: Jun. 13, 2000

[54] ARRANGEMENT FOR ONE VEHICLE TOWING ANOTHER

[75] Inventor: Donald H. Kendall, Almont, Mich.

[73] Assignee: The United States of America as represented by the Secretary of the Army, Washington, D.C.

[21] Appl. No.: 09/146,925

[22] Filed: Aug. 31, 1998

[51] Int. Cl.$^7$ .................................. B60D 1/00; B60P 3/22
[52] U.S. Cl. ............................................ 280/447; 280/839
[58] Field of Search .................................... 280/499, 492, 280/478.1, 479.3, 500, 467, 493, 447, 453, 456.1, 479.2, 837, 839, 204

[56] References Cited

U.S. PATENT DOCUMENTS

| | | | |
|---|---|---|---|
| 1,627,998 | 5/1927 | Porter | 280/447 |
| 2,025,820 | 12/1935 | Miller | 280/447 |
| 2,144,295 | 1/1939 | McGregor | 280/447 |
| 2,184,044 | 12/1939 | Hoepfner | 280/447 |
| 2,788,226 | 4/1957 | Malone | 280/447 |
| 3,215,219 | 11/1965 | Forsyth et al. | 280/492 |
| 3,677,565 | 7/1972 | Slosiarek | 280/499 |
| 4,768,803 | 9/1988 | Hewitt et al. | 280/462 |
| 5,468,007 | 11/1995 | Kanerva | 280/499 |
| 5,480,174 | 1/1996 | Grenier | 280/414.1 |
| 5,624,137 | 4/1997 | Lesesne | 280/839 |

*Primary Examiner*—J. J. Swann
*Assistant Examiner*—Christopher Bottorff
*Attorney, Agent, or Firm*—David L. Kuhn; Peter A. Taucher

[57] ABSTRACT

An arrangement of a track laying combat vehicle towing a trailer utilizes a curved rail affixed to the aft end of the combat vehicle and generally centered about a vertical axis passing near the volumetric center of the combat vehicle. The hitch connection between the combat vehicle and the trailer includes a wheeled carriage that rides on the rail. Because of the rail and carriage, the outward swing of the combat vehicle aft end, which is in the opposite direction from the combat vehicle's turn direction, do not appreciably affect the trailer.

2 Claims, 4 Drawing Sheets

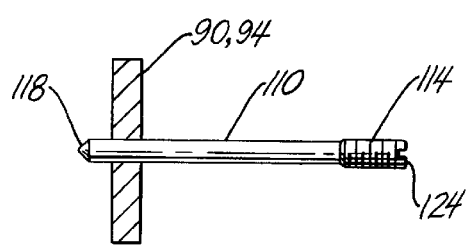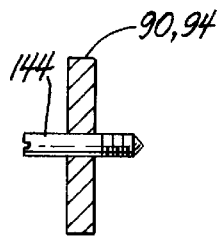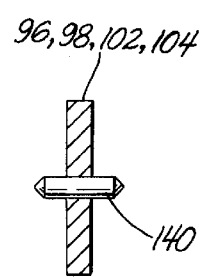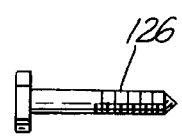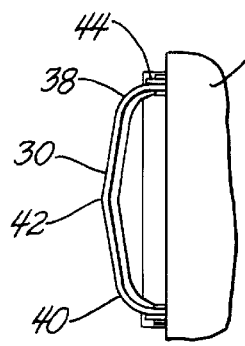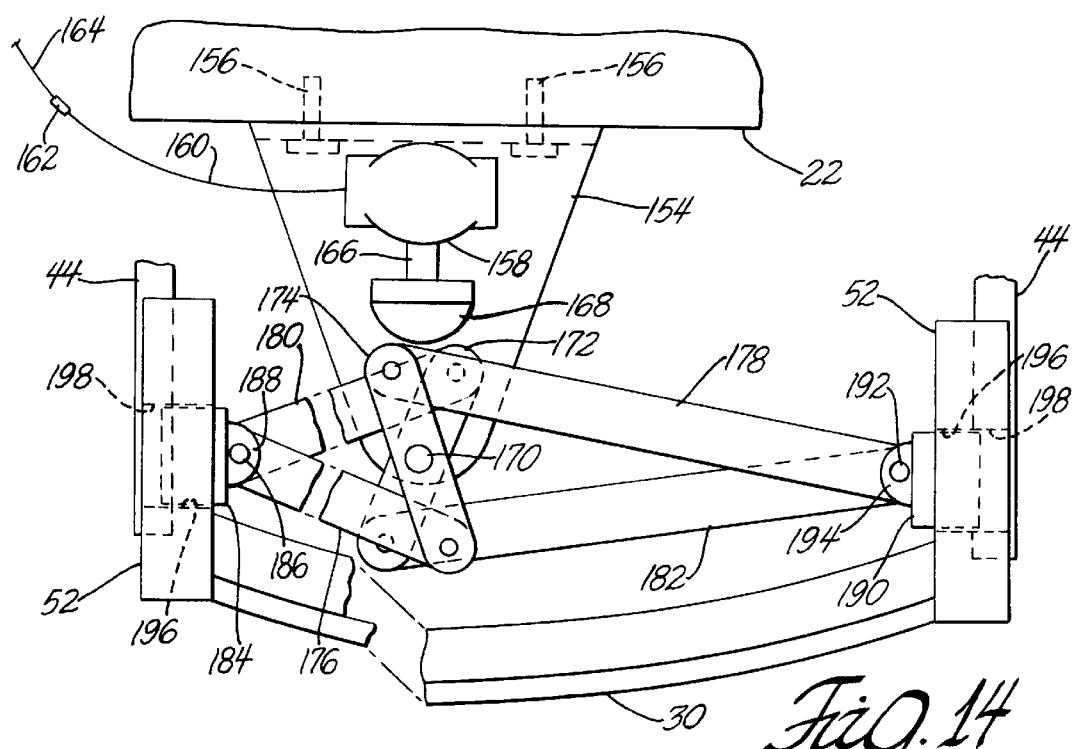

ARRANGEMENT FOR ONE VEHICLE TOWING ANOTHER

GOVERNMENT USE

The invention described here may be made, used and licensed by or for the U.S. Government for governmental purposes without paying me any royalty.

BACKGROUND AND SUMMARY

In land warfare, the effective range of combat vehicles is a critical factor in achieving a decisive edge over opposing forces. Particularly, the range of the heavy battle tank is often pivotal in a ground combat scenario. Accordingly, the US Army has considered concepts for in-transit refuelling of its heavy battle tank, the Abrams M1A2. One of the concepts is to hitch a trailer carrying a fuel container to the rear of the Abrams tank.

There are certain difficulties in hitching a trailer to an Abrams tank. First, the Abrams has an extremely hot and powerful blast of exhaust gas coming from the rear vent of the tank. Second, the trailer must be clear of rotational path of the tank's main gun when the gun is in a fully depressed, downward pointing position. Third, when the tank turns quickly, the aft end of the tank swings in the opposite direction of the turn, thereby pointing the trailer in the opposite direction of the tank's turn.

I address the foregoing difficulties by an arrangement utilizing a curved, cross-sectionally T-shaped rail affixed to the aft end of the tank and generally centered about a vertical axis passing near the tank's volumetric center. The hitch connection between the combat vehicle and the trailer includes a wheeled carriage that rides on the rail. The carriage has a four element housing that can be quickly assembled or disassembled and can journal multiple sets of vertically and horizontally oriented wheels. The multiple sets of wheels prevent play between the carriage and rail while assuring smooth translation of the carriage along the rail. The wheels are elegantly journalled in sets of simple aligning bores of the four housing pieces. Because of the rail and carriage, the outward swing of the tank's aft end does not misdirect the trailer during sharp turns of the tank.

BRIEF DESCRIPTION OF THE DRAWINGS

FIGS. 10, 11 and 12 are wheels and spindles of the carriage.

FIG. 13 is a typical bolt used to fasten the elements of the carriage housing together.

FIG. 14 shows a quick release mechanism that can optionally be incorporated into the hitch arrangement.

FIG. 15 is a plan view of the rail without the carriage.

DETAILED DESCRIPTION

Figure 1:
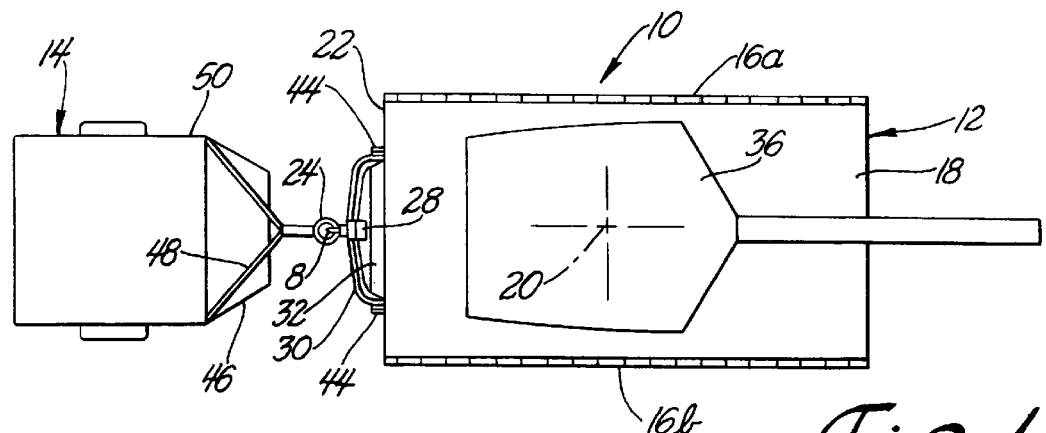
FIG. 1 is a plan view of a hitch arrangement between a tank and a trailer.
Figure 2:
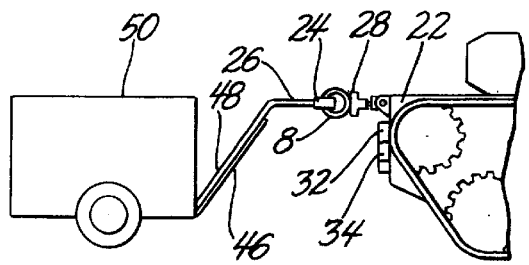
FIG. 2 is a partial side elevational view of the hitch arrangement between the tank and the trailer.

In FIGS. 1 and 2 is shown an arrangement 10 of a track laying vehicle such tank 12 towing a gooseneck trailer 14, the tank having tracks 16a and 16b on either side of hull 18. Tank 12 changes direction to the right or left by accelerating one track relative to the other. For relatively sharp turns the tracks rotate in opposite directions, so that tank 12 tends to pivot about vertical axis 20 passing through a point at or near the volumetric center of hull 18. As the tank executes such turns, the tank's aft end 22 swings out to the left during right hand steering and swings out to the right during left hand steering.

If tank 12 and trailer 14 are joined conventionally, a hitch fixed to the tank engages eye 24 at the terminus of trailer tongue 26. Because of this hitch connection, the forward end of trailer 14 swings with aft end 22 of the tank; and if the tank steers right, the trailer swings left, and vice versa. Hence sharp turns by the tank and trailer are difficult. Arrangement 10 replaces conventional hitch hardware with a hitch ring 8 connected to translatable carriage 28, which rides upon a curved T rail 30. By means of arrangement 10, less of the tank's aft end swing is imparted to the forward end of trailer 14.

T rail 30 is shaped generally as an arc centered on axis 20. In FIG. 15, the T rail shown without carriage 28 to more clearly illustrate aspects of the rail that may be preferred for some applications. Between the ends of rail 30 and a central rail zone 42 are outer rail zones 38 and 40. Outer zones 38 and 40 have smaller radii of curvature than zone 42. Outer zones 38 and 40 are a transition between zone 42 and the points where rail 30 is affixed to ears 44, which in turn are fixed to aft end 22. Due to the difference in curvature between the outer zones and the central zone of the rail, carriage 28 tends to stay in the central zone when tank 12 pulls trailer 14 forward.

Figure 6:
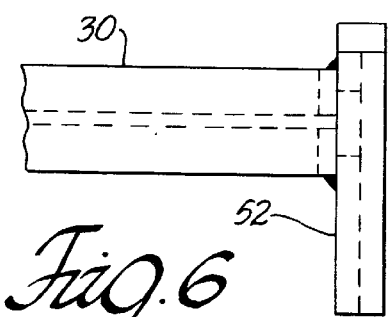
FIG. 6 is an end of the rail.
Figure 7:
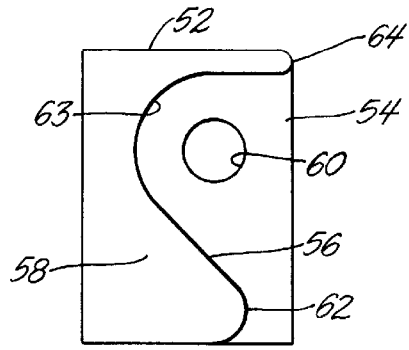
FIG. 7 is a plate at the end of the rail.
Figure 8:
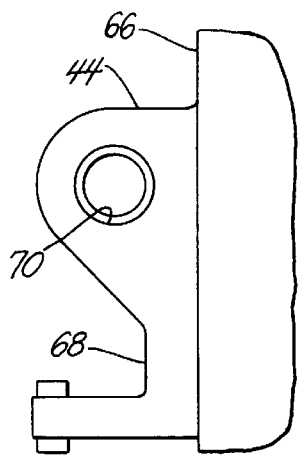
FIG. 8 is an elephant ear at the tank's aft end to which the rail connects.

The connection of rail 30 to ears 44 is perhaps best explained in conjunction with FIGS. 6, 7 and 8. In FIG. 7 is anchor plate 52 which is welded at either end of rail 30. Plate 52 has a flat recess surface 54 that defines aperture 60, surface 54 being bordered by generally S-shaped escarpment 56 that forms the edge of raised surface 58. Escarpment 56 has pocket portion 63 between knee 62 and tangent point 64 and the pocket portion is congruent with the outline of ear 44. When plate 52 is fitted onto ear 44, tangent point 64 contacts region 66 of the tank's aft end while knee 62 bears against the edge of ear extension 68. Meanwhile, aperture 60 axially aligns with beveled ear aperture 70.

Figure 9:
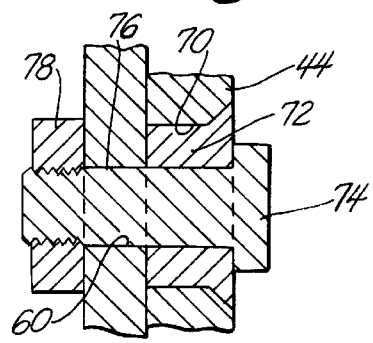
FIG. 9 is a sectional view of the connection between the rail's plate and the elephant ear.

Referring now to FIG. 9, once plate 52 is placed onto ear 44, beveled adapter 72 is inserted into aperture 70. The beveled adapter having an inner diameter equal to the diameter of the plate's aperture 60. The plate ear and adapter are held in fixed relation by fastener 74, which has a shank 76 closely fitting with and passing though aperture 60 and the inner diameter of adapter 72. A conventional lock nut 78 engages the threaded end of fastener 74.

Rail 30 is mounted at the upper zone of aft end 22 so that carriage 28 is above the exhaust gas flowing from vent 32. The gas flow is directed downward by slats or vanes within the vent, a portion of vent 32 being removed in FIG. 2 to show a typical slat 34 therein. Although rail 30 is at the upper zone of end 22, it 30 is low enough to avoid interference with the rotation of turret 36 (FIG. 1) and is typically not mounted on rear deck 38. Due to the goose neck construction of trailer 14, trailer tongue 26 is at the same vertical level as rail 30. Optionally, the goose neck construction includes a sheet metal heat shield 46 on oblique frame members 48 that connect tongue 26 to the body 50 of trailer 14. The heat shield protects trailer 14 and its contents from the hot exhaust gas flowing from vent 32.

Figure 3:
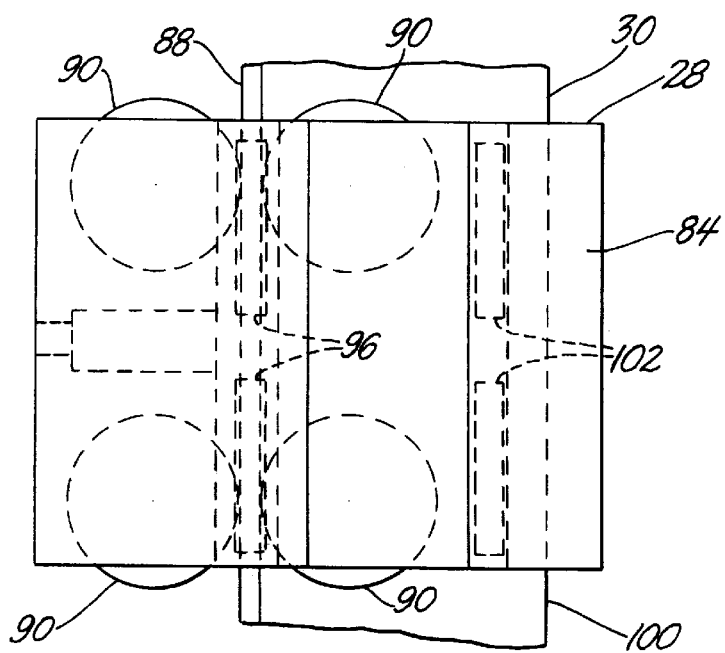
FIG. 3 is a plan view of a carriage showing the position of wheels mounted therein and their juxtaposition to a rail on which the carriage translates.
Figure 4:
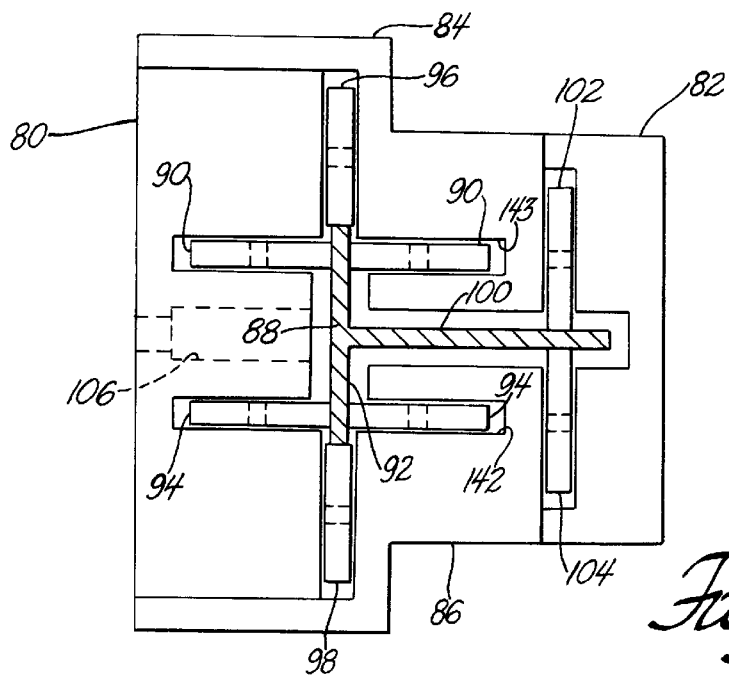
FIG. 4 is an end elevational view of the carriage showing the position of the wheels and their juxtaposition to the rail.

FIGS. 3 and 4 are views of carriage 28 showing the location of roller wheels therein and showing the juxtaposition of these wheels with rail 30. Carriage 28 has a terminus block 80 fixed between upper shroud 84 and lower shroud 86, the lower shroud being a mirror image of the upper shroud. Fixed to both shrouds is a frontal housing cap 82. The fasteners holding the carriage's housing together are omitted in FIGS. 3 and 4, as are the spindles associated with the wheels. The fasteners and axle pins are shown in subsequent figures.

Within the carriage housing is journalled a first set of four roller wheels designated as upper flange face engagement wheels 90, these wheels tangentially rolling against upper flange 88 of rail 30. A similar set of four wheels is comprised of lower flange face engagement wheels 94 journalled within the carriage and rolling tangentially against lower flange 92 of rail 30. A pair of vertically oriented wheels 96 are journalled in the carriage, and they roll tangentially on the edge of upper flange 88. Another, similar pair of vertically oriented wheels 98 are also journalled in the carriage, this other pair rolling tangentially upon the edge of lower flange 92. Third and fourth pairs of vertically oriented wheels, respectively 102 and 104, are journalled within the carriage and roll against the upper and lower faces of web 100 of rail 30.

Figure 5:
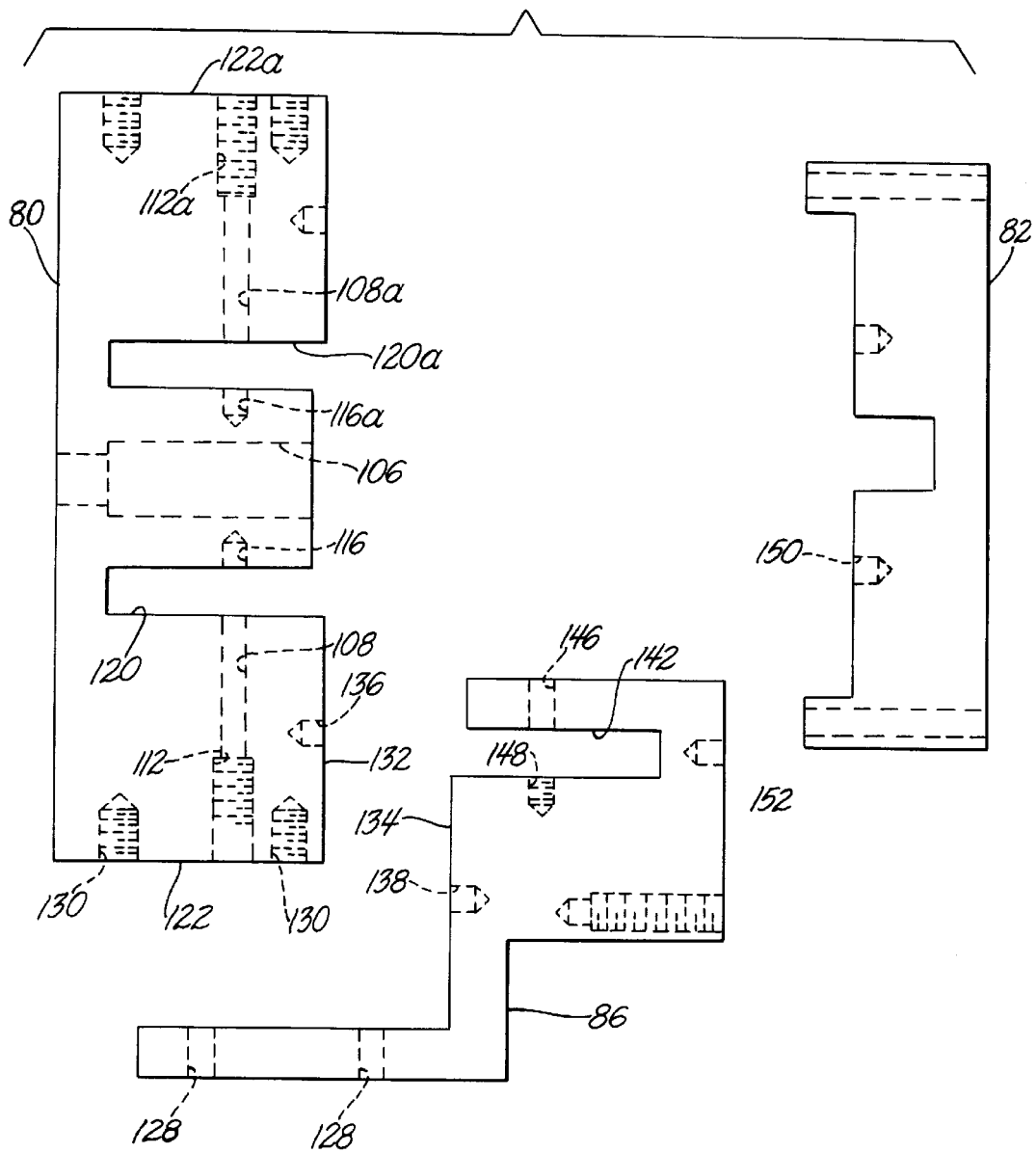
FIG. 5 is an exploded view of elements of the carriage housing.

FIG. 5 is an exploded view showing the various bores in terminus block 80, cap 82 and lower shroud 86. Terminus block 80 has stepped bore 106 which receives an extension (not shown) of hitch ring 8. The terminus block also defines a pair of through bores 108 that accommodate spindles such as spindle 110 in FIG. 10, the through bores having threaded exterior ends 112 that mate with spindle threads 114. Coaxial with bores 108 are blind bores 116 which receive unthreaded interior ends 118 of spindles 110. When carriage 28 is assembled, two of wheels 94 will be disposed in slot 120 and will turn on the axes of spindles 110, which engage bores 108 and 116. In similar fashion, two wheels 90 will be disposed in slot 120a and will turn on the axis of other spindles 110 which engage bores 108a and 116a. The threaded ends 124 of the spindles are recessed with respect to surfaces 122 and 122a. The threaded ends define slots or other suitable structure to receive a tool head by which the spindles 110 can be screwed into place.

Lower shroud 86 is attached to terminus block 80 by bolts 126 (FIG. 13) inserted through shroud bores 128 into threaded bores 130. Surface 132 of block 80 and surface 134 of shroud 86 will border a slot accommodating wheels 98. Blind bores 136 at surface 132 aligns axially with blind bores 138 at surface 134, these blind bores receiving the ends of stub spindles 140 (FIG. 12) on which wheels 98 rotate. Wheels 96 (FIG. 4) are journalled between shroud 84 and block 80 in the same fashion that wheels 98 are journalled between shroud 86 and block 80.

Within slot 142 of lower shroud 86 are two wheels 94 on spindles 144 (FIG. 11) journalled in bores 146 and 148, and two wheels 90 are similarly rotatably mounted in slot 143 of upper shroud 84. When terminus block 82 is bolted to lower shroud 86, a gap accommodating wheels 104 is formed, and blind bores 150 and 152 are axially aligned so as to receive the additional stub spindles 140 by which wheels 104 are mounted in the gap. In similar fashion, two wheels 102 are mounted between block 82 and upper shroud 84 on stub spindles 140.

In FIG. 14 is shown a modification to arrangement 10 which allows for quick release of trailer 14 from tank 12. The modification includes a bracket fixed to the tank's aft end 22 by shear pins 156. Mounted to the bracket is electric motor 158 whose power line 160 leads therefrom to a quick disconnect electrical connector 162, which receives power from the tank through line 164. Operation of motor 158 translates piston 166 on which is located cam head 168.

Fixed to bracket 154 is axis pin 170 on which stub arms 172 and 174 swing independently of each other. Stub arm 172 is pivotally connected to arms 180 and 182, while stub arm 174 is pivotally connected to elongte arms 176 and 178. Elongate arms 176 and 180 are connected together with plug 184 by pin 186 through plug bracket 188 while elongate arms 178 and 182 are connected together with plug 190 by pin 192 in plug bracket 194. Plugs 184 and 190 fit closely in apertures 196 of rail plates 52 and apertures 198 in elephant ears 44. Optionally, the plugs are tapered for easier entry into the respective apertures.

When motor 158 drives cam head 168 into the stub arms, stub arm 172 swings clockwise and stub arm 174 swings counterclockwise, causing the elongate arms to draw plugs 184 and 190 out of elephant ear apertures 198. Now shear pins 156 and connector 162 are the only elements that hold trailer 14 to tank 12. These pins will shear and connector will release as soon as the tank turns or encounters roughness in the terrain over which it travels.

I wish it to be understood that I do not desire to be limited to the exact details of construction or method shown herein since obvious modifications will occur to those skilled in the relevant arts without departing from the spirit and scope of the following claims.

What is claimed is:

1. An arrangement of one vehicle towing another vehicle, comprising:

fore and aft zones of the one vehicle;

a medial zone of the one vehicle between the fore and aft zones;

a steering axis of the one vehicle in the medial zone at a region containing the volumetric center of the one vehicle;

a curved rail affixed to an upper portion of the aft zone, the rail disposed generally along an arc centered on the steering axis;

a central portion of the rail having a central portion's radius of curvature centered on the steering axis;

lateral portions of the rail adjoining the central portion and having lateral portions' radii of curvature smaller than the central portion's radius of curvature;

a carriage unit riding on the curved rail;

wherein a carriage unit path changes its curvature radius as the carriage unit passes from the central portion of the rail to the lateral portions of the rail;

a hitch connection coupler on the carriage unit;

a forward end of the other vehicle;

a goose neck construction at the forward end;

a tongue of the goose neck construction disposed vertically at the height of the rail;

a hitch connection eye on the tongue, the eye secured to the hitch connection coupler.

2. An arrangement of a track laying combat vehicle towing a trailer, wherein the combat vehicle has a traversing turret and has a main gun on the turret swingable between a fully raised gun position and a fully depressed gun position, and wherein the combat vehicle has a vent on one end of the combat vehicle for directing a blast of engine exhaust downward, the arrangement comprising:

- fore and aft zones of the combat vehicle, the one end and the exhaust vent being in the aft zone;
- a medial zone of the combat vehicle between the fore and aft zones;
- a steering axis of the combat vehicle in the medial zone in a region containing the volumetric center of the vehicle;
- a pair of mounting ears fixed to the upper portion of the aft zone;
- a curved rail affixed to the ears, the rail disposed generally along an arc centered on the steering axis;
- the curved rail having a varied curvature wherein a central portion of the rail has a central portion's radius of curvature centered on the steering axis, and wherein lateral portions of the rail adjoin the central portion and have lateral portions' radii of curvature smaller than the central portion's radius of curvature;
- means for quickly disconnecting the rail from the upper portion of the aft zone;
- a carriage unit riding on the curved rail, the carriage unit and rail being clear of a traverse path of the main gun when the main gun is in a fully depressed condition, the carriage unit and rail also being clear of a flow of the engine exhaust;
- wherein a carriage unit path changes its curvature radius as the carriage unit passes from the central portion of the rail to the lateral portions of the rail;
- a hitch connection coupler on the carriage unit;
- wheels journalled in the carriage unit, the wheels rolling on the rail;
- a forward end of the trailer;
- a goose neck construction at the forward end;
- a tongue of the goose neck construction vertically located at the height of the rail;
- frame members of the goose neck construction extending obliquely to the tongue and extending to a bottom region of the front end of the trailer;
- means for protecting the forward end from the engine exhaust blast, the protecting means comprising a shield fixed on the frame members;
- a hitch connection eye on the tongue, the eye secured to the hitch connection coupler.

* * * * *